United States Patent [19]
Eichelberger et al.

[11] 3,801,820
[45] Apr. 2, 1974

[54] METHOD AND APPARATUS FOR SENSING RADIATION AND PROVIDING ELECTRICAL READOUT

[75] Inventors: Charles W. Eichelberger, Schenectady; Hubert K. Burke, Scotia, both of N.Y.

[73] Assignee: General Electric Company, Schenectady, N.Y.

[22] Filed: Feb. 9, 1973

[21] Appl. No.: 331,194

[52] U.S. Cl. .............. 250/211 J, 178/6, 250/220 M, 317/235 N, 340/173 LS
[51] Int. Cl. .............. H01j 39/12
[58] Field of Search .............. 178/6, 6.6; 340/166 R, 340/173 LS, 173 LT; 250/211 R, 211 J, 220 M; 317/235 N

[56] References Cited

UNITED STATES PATENTS

| | | | |
|---|---|---|---|
| 3,562,418 | 2/1971 | Glusick | 178/6 |
| 3,537,071 | 10/1970 | Weimer | 340/173 LS |
| 3,721,839 | 3/1973 | Shannon | 250/211 J |
| 3,683,193 | 8/1972 | Weimer | 317/235 N |

*Primary Examiner*—James W. Lawrence
*Assistant Examiner*—D.C. Nelms
*Attorney, Agent, or Firm*—Julius J. Zaskalicky; Joseph T. Cohen; Jerome C. Squillaro

[57] ABSTRACT

A plurality of radiation sensing and storage sites are provided on a substrate of semiconductor material arranged in a plurality of rows and columns. Each site includes a row oriented plate and a column oriented plate to form a pair of closely coupled capacitive cells with the substrate. A plurality of row conductor lines are provided, each connected to the row oriented plates of a respective row. A plurality of column conductor lines are also provided, each connected to the column oriented plates of a respective column. Means are provided for selectively isolating the conductor lines fron the substrate. During read out of charge stored in a particular site a selected row line and a selected column line are connected in circuit with the substrate. Accordingly, the charge injected into the substrate by such action is integrated across the inherent capacitance associated with the preselected row line instead of the inherent capacitance of all of the conductor lines with respect to the substrate.

10 Claims, 26 Drawing Figures

METHOD AND APPARATUS FOR SENSING RADIATION AND PROVIDING ELECTRICAL READOUT

The present invention relates in general to apparatus including devices and circuits therefor for sensing radiation and developing electrical signals in accordance therewith. The present invention relates in particular to such apparatus which senses and stores charge produced by electromagnetic radiation flux and which provides an electrical readout of the stored charge.

This application relates to improvements in the method and apparatus of copending patent application Ser. No. 264,804 filed June 21, 1972 and assigned to the assignee of the present application, which application is incorporated herein by reference.

The radiation sensing apparatus disclosed in the aforementioned patent application comprises a substrate of semiconductor material of one conductivity type having a plurality of storage sites arranged in a plurality of rows and columns for storage of radiation generated minority carriers therein. Each of the storage sites includes a row oriented conductor-insulator-semiconductor capacitive cell and a closely coupled column oriented conductor-insulator-semiconductor capacitive cell. Each of the row-oriented conducting members or plates of a row of sites are connected to a respective row conductor line. Each of the column-oriented conducting members or plates of a column of sites are connected to a respective column conductor line. Switching means are provided for periodically connecting and disconnecting the substrate from ground or point of reference potential. Means are provided for charging the row and column conductor lines to predetermined potentials in relation to the potential of the point of reference potential to establish depletion regions in the substrate underlying each of the first and second conductive plates with the depletion regions underlying adjacent first and second conductive plates being coupled. Selective read out of charge stored in a row of sites is accomplished by changing the potential on the row line to cause flow of charge stored in the row-oriented storage cells thereof into the column-oriented storage cells thereof. The read out of charge stored in column-oriented cells is accomplished by changing the potential on each of the column lines in sequence to cause injection of carriers stored therein into the substrate in sequence and concurrently disconnecting the substrate from ground or reference potential during each such injection of carriers. Each such injection produces a respective current flow in circuit with the substrate which is sensed across an integrating capacitance which includes the inherent capacitance of the conductor lines and conducting members connected thereto in relation to the substrate. Means are provided for periodically sampling the variation in voltage developed on the integrating capacitance to provide an electrical output varying in time in accordance with the variation in amplitude of the samples.

As the number of storage sites in an array is increased the total inherent capacitance of the substrate in relation to ground or a point of reference potential increases and hence the signal voltage developed across the capacitance decreases. As a result, in arrays having a large number of pairs of storage cells the signal level can become quite small. In addition, as the photon generated currents from the conductor-insulator-semiconductor capacitive cells other than the selected site pass through the integrating capacitance when not bypassed by the switching means, the aggregate photon generated current which flows may exceed the current from the selected site and accordingly mask the desired signal. Even when the injection current exceeds the photon generated current flowing due to creation of photon generated electron-hole pairs at the sites other than the one being read out, such photon generated current introduces noise into the signal current and hence introduces noise into the voltage appearing across the integrating capacitance.

The present invention is directed to overcoming problems such as outlined above in radiation responsive apparatus of the kind described above.

Accordingly, an object of the present invention is to provide improved surface charge storage devices and methods of operating such devices.

Another object of the present invention is to provide arrays of radiation sensing elements of the kind described above which include very large numbers of sensing elements with minimum degradation of the output signal therefrom.

A further object of the present invention is to provide arrays of radiation sensing elements of the kind described above which include very large numbers of sensing elements with minimal increase in non-accessed element noise over that obtained in arrays having a small number of sensing elements.

In carrying out the invention in one illustrative embodiment thereof means are provided for charging the row and column conductor lines to predetermined potentials and disconnecting the row and conductor lines from circuit with the substrate except for the row line and column line associated with the capacitive cell selected for read out. With such organization of the radiation sensing apparatus the integrating capacitance is only the capacitance of the selected row conductor line and the plates or conductive members connected thereto whereby the improved performance mentioned above is obtained.

In a preferred form of the invention each of the column conductor lines and the row conductor lines are connected in circuit with a source of operating or charging potential through a respective gating device such as a MOSFET transistor in which the impedance of the source drain conduction path is set by the voltage applied to the gate thereof. The row and conductor lines are periodically charged through the gating devices by application of a suitable gating pulse thereto occurring, for example, at the end of the period of scan of the storage sites of a row of storage sites when the read out function is not being formed. During this interval of time as the substrate is connected to the reference potential point and all of the conductive lines are in circuit with the source of operating potential and the substrate, charging current can flow to recharge the depletion regions of the various sites.

The novel features which are believed to be characteristic of the present invention are set forth with particularity in the appended claims. The invention itself, both as to its organization and method of operation, together with further objects and advantages thereof may best be understood by reference to the following description taken in connection with the accompanying drawings wherein:

Figure 1A:
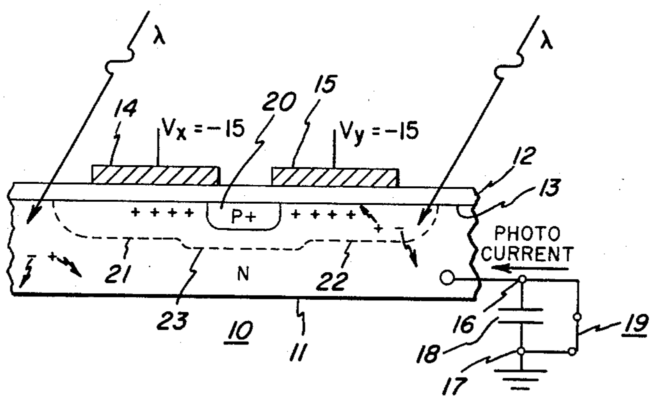
FIGS. 1A-1C show diagrams of pairs of conductor-insulator-semiconductor cells of the kind incorporated in the radiation sensing array of FIG. 3, illustrating various stages of operation thereof.
Figure 1B:
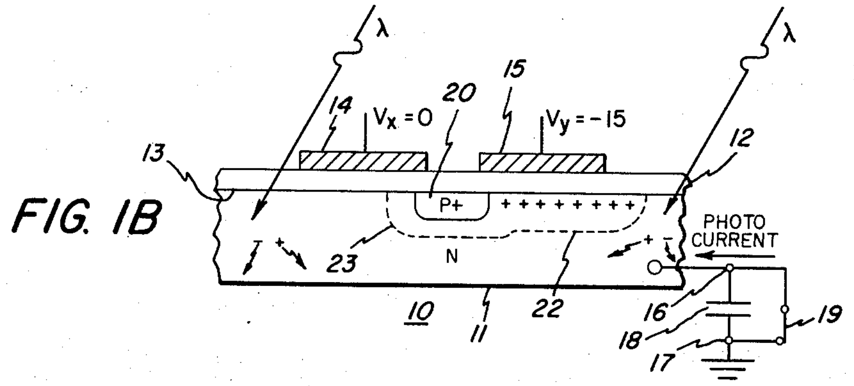
Figure 1C:
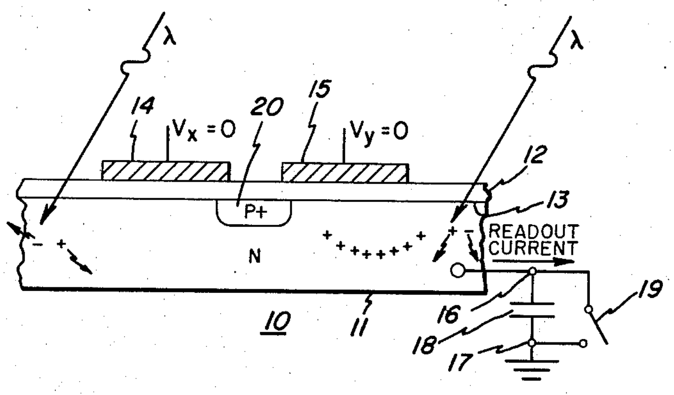

Reference is now made to FIGS. 1A, 1B and 1C which show a pair of coupled sensing cells particularly suitable for operation in two dimensional arrays. FIG. 1A shows a device 10 including a substrate 11 of N-type conductivity semiconductor material, an insulating member 12 overlying the major surface 13 of the substrate, and the pair of conductive members or plates 14 and 15 overlying the insulating member. Plate 14 is adapted to be connected to a row conductor line of an array consisting of rows and columns of radiation sensing devices. Plate 15 is adapted to be connected to a column conductor line of the array. Integrating capacitor 18 is connected between the substrate terminal 16 and ground terminal 17. This capacitor represents the capacitance of the plate 14 with respect to the substrate as well as intentionally added capacitance. A reset switch 19 is connected across terminals 16 and 17. Plates 14 and 15 are closely spaced and the substrate underlying the space between the plates is provided with a P-type conductivity region 20. The plate 14 and plate 15 are connected to operating potential points on a source (not shown) of operating voltage to provide the indicated negative potentials with respect to ground, i.e. $V_x = -15$ volts and $V_y = -15$ volts. The connection to column oriented plate 15, the ground terminal 17, and the substrate terminal 16 are referred to respectively as first, second and third terminals, and, in addition, the connection to the row oriented plate 14 is referred to as the fourth terminal. The storage potentials applied to the column oriented plate 15 and to the row oriented plate 14 are referred to respectively, as first and fourth potentials. The reference or ground potential is referred to as the second potential. The injection potential for the column oriented plate 15 is referred to as the third potential.

When potentials of appropriate polarity with respect to the substrate and appropriate magnitude, for example the −15 volts indicated in FIG. 1A, are applied to the plates 14 and 15, a pair of depletion regions 21 and 22 are formed which are connected together by the high conductivity P-type region 20 which also has a depletion region 23 associated with it. Accordingly, charge stored in one of the depletion regions under either of the plates 14 and 15 may readily flow to the other depletion region through the P-type conductivity region 20. Radiation flux entering the depletion regions causes the generation of minority carriers which are stored at the surface of the depletion regions. This condition is indicated by current flow into the substrate as charge accumulates in the surface portion of the depletion regions and corresponds to conduction of electron charge in the external potential applying circuits between the plates and the substrate. FIG. 1B shows the condition of the device when the voltage on plate 14 is set at zero to collapse the depletion region 21 thereof and cause the charge that was stored therein to flow or transfer into the inversion layer in region 22 underlying the plate 15. To read out or sense the charge that has been stored in the inversion layer, potential on the plate 15 is collapsed or reduced in magnitude to a suitable value, such as zero, after the reset switch 19 connected across the integrating capacitor 18 has been opened. Such action causes the carriers stored in the inversion layer to be injected into and produce a current flow out of the substrate corresponding to the charge stored in the depletion region 22 and injected into the substrate.

The increase in potential of the plate 15 from a negative value to a zero value causes a reduction in the electric field that maintained the charge in the surface inversion layer and causes the minority carriers stored in the inversion layer to be injected into the substrate. The injection of minority carriers is indicated by the distribution of positive charge throughout the substrate 11. Such injection causes a neutralizing negative charge to flow into the substrate, i.e. a conventional current to flow out of the substrate. Such current flows from the substrate 11 into the capacitor 18 which becomes charged to a value dependent on the injected charge. The minority carriers injected into the substrate eventually diffuse or recombine therein. Reestablishment of the depletion region for another cycle of operation should await disappearance of such minority carriers from the region 22, otherwise the stored charge would be reaccumulated or recollected on reestablished of depletion in the region 22. The potential on plate 15 is returned to its original value prior to closing of the reset switch 19 and subsequent to the time during which the injected minority carriers have disappeared from the region 22. In this mode of operation the current flow into the substrate substracts from the current flow out of the substrate. The depletion region component of current flow out of the substrate, identified as due to remaining depletion charge, is very nearly equal to the current flow into the substrate which initially established the depletion region, referred to as depletion region charging current.

Samples may be taken of the voltage on the integrating capacitor resulting from successive cycles of operation of the cell to provide a video signal which respesents the integrated value of radiation falling on the cell in successive cycles of operation. Thus, spurious signals produced in the video output due to the drive voltages applied to the cell are largely eliminated. In the case of an array, charge contained in the stray capacitance of the conductors connected to the plates of the device being read out is also included in current flowing into the integrating capacitance. This component of current can be quite large in relation to the current flow in response to injection of the charge. However, as this component of current is not affected by storage of charge in the device, it is completely cancelled by reestablishment of storage potential on the device. Also, in arrays, variations in the cell capacitances are eliminated as long as the first and third potential levels do not vary in the scanning of the array. While in the example the third potential applied to the plate 14 was ground or identical to the second potential, it should be readily apparent that the third potential could be any potential between the first and second potentials.

Figure 2A:
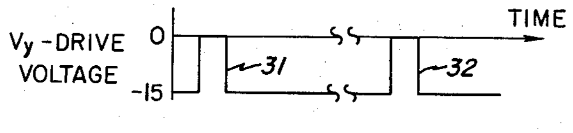
FIGS. 2A–2C are graphs of various voltage and current signals appearing in the diagrams of FIGS. 1A–1C useful in explaining the operation thereof.
Figure 2B:
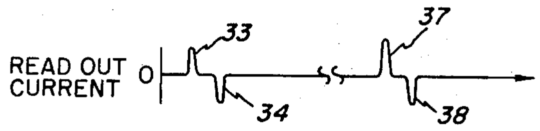
Figure 2C:
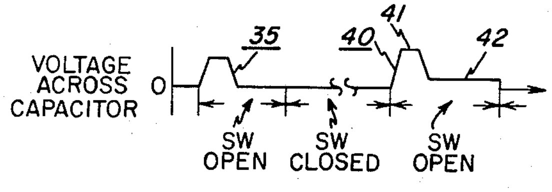

Reference is now made to FIGS. 2A, 2B and 2C which show, respectively, graphs of column oriented plate drive voltage $V_y$, read out current, and integrating capacitor voltage drawn to a common time scale for the device shown in FIGS. 1A, 1B and 1C for two different conditions of charge storage in the cells, one in which no radiation produced charge has been stored and the other in which charge has been stored in response to radiation. It is assumed that the voltage $V_x$ of the row oriented plate has been reduced to zero. FIG. 2A shows identical pulses 31 and 32 of drive voltage applied to the plate 15 in different cycles of operation. FIG. 2B shows the currents which flow through the substrate connection in response to the application of such pulses. FIG. 2C shows the voltage developed across the capacitor 18 due to the current flow shown in FIG. 2B. FIG. 2C also shows the periods of time during which the reset switch 19 is open and periods of time during which it is closed. The first pair of current pulses 33 and 34 shown in FIG. 2B represent a condition in which no radiation has been received and hence no charge stored in the column oriented cell of the device 10. During the change of voltage from a minus fifteen volt level to ground level, the charge used to establish the depletion region 22 flows out and appears as the positive going pulse 33. After the read out period the voltage on the plate is returned to its minus fifteen volt level and produces charge flow, represented by a current pulse 34 to establish the initial depletion region under the plate 15 and is equal to the current pulse 33. Accordingly, a voltage pulse 35 is developed across capacitor 18 which is essentially identical in form except for its amplitude to pulse 31. The net voltage output at the end of the integration operation is zero as shown in FIG. 2C.

Attention is now directed to pulses 37 and 38 produced in response to application of pulse 32 to the column oriented cell. The positive pulse 37 of large amplitude represents the charge stored in the depletion region 22 in response to radiation as well as some of the charge which flowed into the substrate as a result of the depletion region capacitance. The negative pulse 38 of small amplitude represents current which flows into the substrate to establish the initial depletion region therein. Integration of pulses 37 and 38 in capacitor 18 produces a pulse 40 of the form shown. Initially, the voltage across the capacitor 18 rises to a large amplitude or level 41 due to the first pulse 37 of current and upon occurrence of the second pulse 38 of current the voltage on the capacitor drops to a second level 42, conveniently referred to as the back porch of the pulse. The second level 42 represents a voltage corresponding to the charge stored in the inversion layer of region 22. Note that the reset switch 19 is open during the sampling interval, i.e. during the occurrence of the voltage pulses of FIG. 2C of each cycle of operation of the sensing device and remains closed during the remainder of the cycle during which storage of charge is occurring in the device in the case of a system with a single device. Successive cycles of operation of the device in circuit would produce successive voltage pulses such as pulse 40, the back porch of which varies in accordance with the radiation incident on the device during the storage period. Sampling the back porch of the successive voltage pulses would provide a signal representing the variation of radiation incident on the device as a function of time.

In the case of an array of such devices the switch 19 which shorts out the integrating capacitance is common to all of the devices of the array and is opened and closed during the readout of each device of the array and accordingly is cycled many times during a storage and readout cycle of a single device of the array. The dielectric capacitance of the cell is preferably large in relation to initial depletion capacitance of the cell to provide a large ratio of storage capability for photon generated charge to spurious current due to charging and discharging of the depletion region. A ratio of dielectric to depletion capacitance of ten to one in each of the cells of a two dimensional array of a large number of cells provides adequate storage capability to represent a large range of radiation intensities while the spurious signal due to the depletion region is small enough that amplifier overloading and consequent loss of cancellation of capacitive signals from the unaccessed cells (half-selected) in a column of the array does not occur. Two ways in which to alter the ratio for given operation potentials is by altering the insulating layer thickness or by altering the resistivity of the substrate.

The integrating capacitance is preferably large in relation to the dielectric capacitance of a cell in order to provide relatively small fluctuations in substrate potential in the cyclical operation of the cell. With larger integrating capacitance, the voltage variation thereon in response to signal currents from the substrate are correspondingly smaller i.e. the signal to noise ratio of the sampled signal decreases. With smaller integrating capacitance the variation in substrate potential becomes larger and correspondingly less charge is injected into the substrate for a given difference between storage potential and injection potential on the plate of the cell, or expressed in other words a greater such difference in potential is required to obtain full injection of stored charge.

On the other hand if the integrating capacitance is very large as would inherently be the case with arrays having a large number of radiation sensing elements the signal level appearing across the integrating capacitance would be quite small thereby providing a poorer signal to noise ratio of the sampled signal. In addition, as photon generated current from all of the sensing sites of the array flows through the integrating capacitance with the reset switch open, the sampled signal is further degraded by such current flows. The present invention is particularly directed to overcoming such problems as presented in radiation sensing apparatus of the kind under consideration herein and will be particularly described in connection with FIG. 7.

Figure 3:
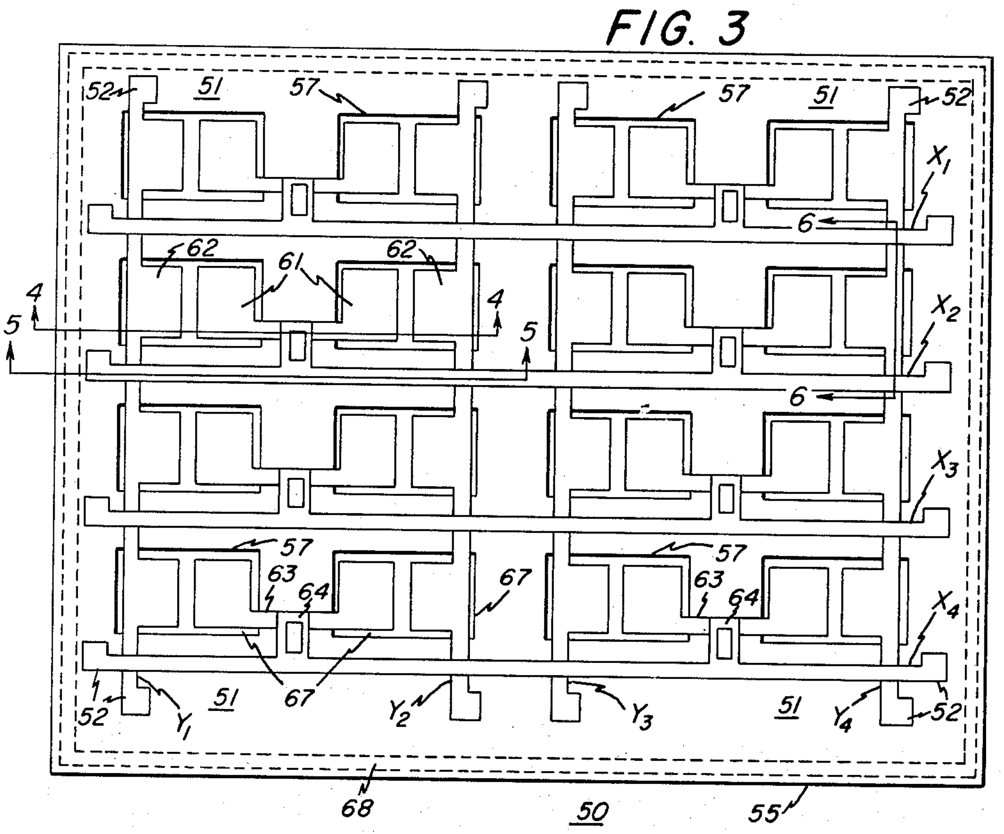
FIG. 3 is a plan view of an array or assembly of a plurality of radiation responsive cells such as shown in FIG. 1A–1C formed on a common semiconductor substrate.
Figure 4:
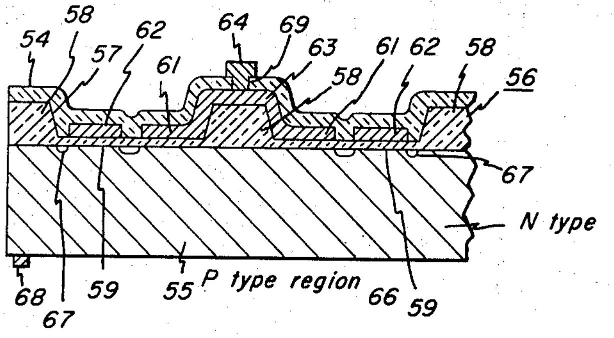
FIG. 4 is a sectional view of the assembly of FIG. 3 taken along section lines 4—4 of FIG. 3.
Figure 6:
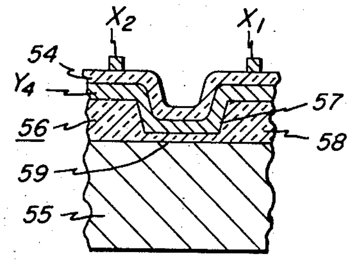
FIG. 6 is a sectional view of the assembly of FIG. 3 taken along section lines 6—6 of FIG. 3.
Figure 5:
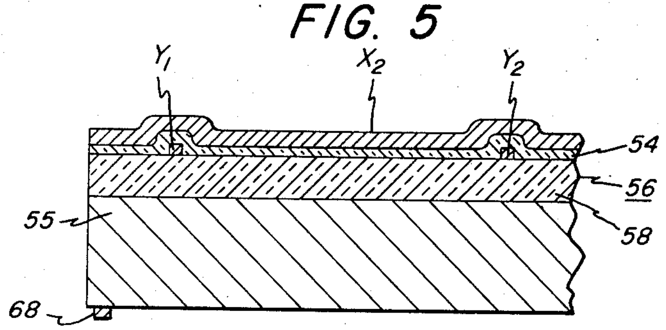
FIG. 5 is a sectional view of the assembly of FIG. 3 taken along section lines 5—5 of FIG. 3.

Before proceeding to describe the radiation sensing apparatus of FIG. 7 embodying the present invention the radiation sensing array used in the apparatus will be described. Reference is now made to FIGS. 3, 4, 5 and 6 which show an image sensing array 50 of radiation sensing devices 51, such as device 10 described in FIGS. 1A, 1B and 1C, arranged in four rows and columns. The array includes four row conductor lines, each connecting the row-oriented plates of a respective row of devices, and are designated from top to bottom $X_1$, $X_2$, $X_3$ and $X_4$. The array also includes four column conductor lines, each connecting the column-oriented plates of a respective column of devices, and are designated from left to right $Y_1$, $Y_2$, $Y_3$ and $Y_4$. Conductive connections are made to lines through conductive landings or contact tabs 52 provided at each end of each of the lines. While in FIG. 3 the row conductor lines appear to cross the column conductor lines, the row conductor lines are insulated from the column lines by a layer 54 of transparent glass as is readily apparent in FIGS. 4, 5 and 6. In FIG. 3 the outline of the structure underlying the glass layer 54 is shown in solid outline for reasons of clarity.

The array includes a substrate or wafer 55 of semiconductor material of N-type conductivity over which is provided an insulating layer 56 contacting a major face of the substrate 55. A plurality of deep recesses 57 are provided in the insulating layer, each for a respective device 51. Accordingly, the insulating layer 56 is provided with thick or ridge portion 58 surrounding a plurality of thin portions 59 in the bottom of the recesses. On the bottom or base of each recess are situated a pair of substantially identical conductive plates or conductive members 61 and 62 of rectangular outline. Plate 61 is denoted a row-oriented plate and plate 62 is denoted a column oriented plate. The plates 61 and 62 of a device 51 are spaced close to one another along the direction of a row and with adjacent edges substantially parallel. In proceeding from the left hand portion of the array to the right hand portion, the row-oriented plates 61 alternate in lateral position with respect to the column oriented plates 62. Accordingly, the row-oriented plates 61 of pairs of adjacent devices of a row are adjacent and are connected together by a conductor 63 formed integral with the formation of the plates 61. With such an arrangement a single connection 64 from a row conductor line through a hole 69 in the aforementioned glass layer 54 is made to the conductor 63 connecting a pair of row-oriented plates. The column-oriented conductor lines are formed integrally with the formation of the column-oriented plates 62. The surface adjacent portion of the substrate 55 underlying the space between the plates 6 and 62 of each device 81 is provided with a P-type conductivity region 66 corresponding to the P-type conductivity region 20 of FIG. 1A. Region 67 in the substrate is also of P-type conducitvity and is formed concurrently with the formation of P-type region 66 in accordance with the diffusion technique for the formation thereof in which the plates 61 and 62 are used as diffusion masks. The glass layer 54 overlies the thick portion 58 and thin portion 59 of the insulating layer 56 and the plates 61 and 62, conductors 63 and column-oriented conductor lines $Y_1$–$Y_4$ thereof except for the contact tabs 52 thereof. The glass layer 54 may contain an acceptor activator and may be utilized in the formation of the P-type regions 66 and 67. A ring shaped electrode 68 is provided on the major surface of the substrate opposite the major surface on which the devices 51 were formed. Such a connection to the substrate permits rear face as well as front face interception of radiation from an object to be sensed.

The image sensing array 50 and the devices 51 of which they are comprised may be fabricated using a variety of materials and in variety of sizes in accordance with established techniques for fabricating integrated circuits as described in the aforementioned patent application Ser. No. 264,804.

Figure 7:
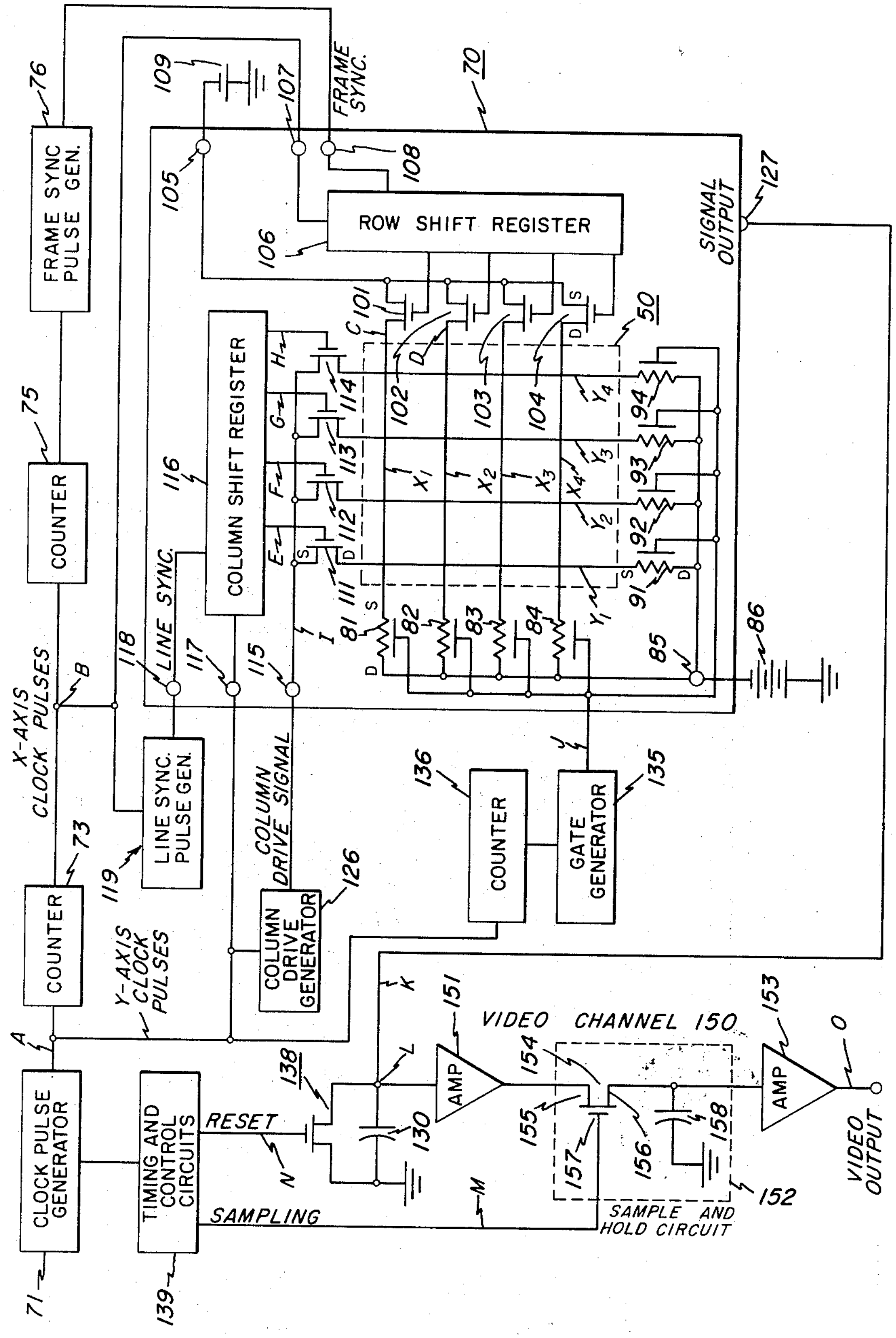
FIG. 7 is a block diagram of a system including the image sensing array of FIGS. 4–7.

Referring now to FIG. 7, there is shown a block diagram of radiation detection apparatus or system including the image sensing array 50 of FIG. 3 which provides a video signal in response to radiation imaged on the array by a lens system (not shown), for example. The video signal may be applied to a suitable display device (not shown) such as a cathode ray tube as described in the above-referenced patent application Ser. No. 264,804 along with sweep voltages synchronized with the scanning of the array to convert the video signal into a visual display of the image.

Figure 8A:
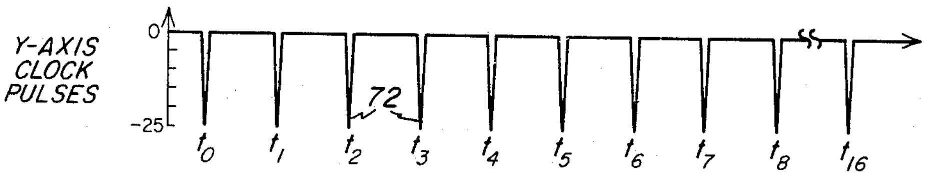
FIGS. 8A through 8O are diagrams of amplitude versus time drawn to a common time scale of signals occurring at various points in the assembly of FIG. 7. The point of occurrence of a singal of FIGS. 8A–8O in the block diagram of FIG. 7 is identified in FIG. 7 by a literal designation corresponding to the literal designation of the figure.
Figure 8B:
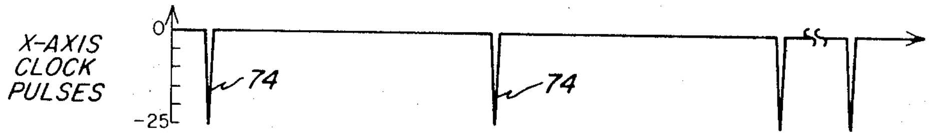
Figure 8C:
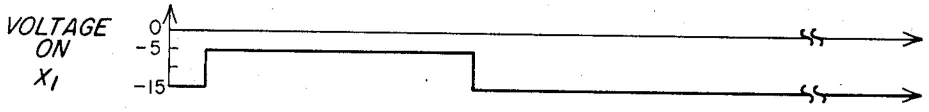
Figure 8D:
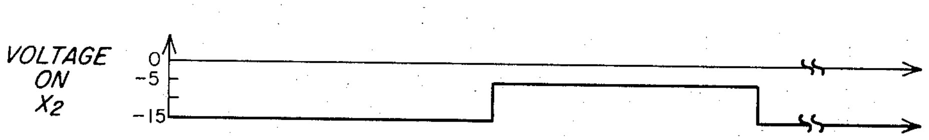
Figure 8E:
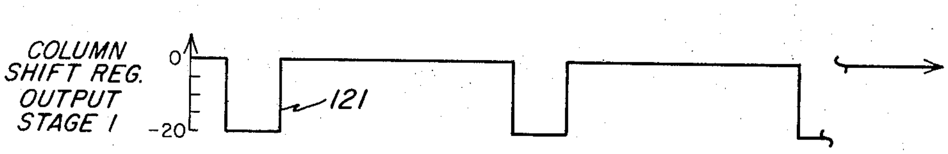
Figure 8F:
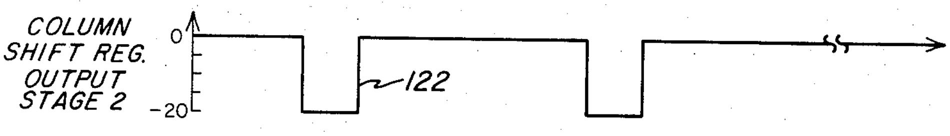
Figure 8G:
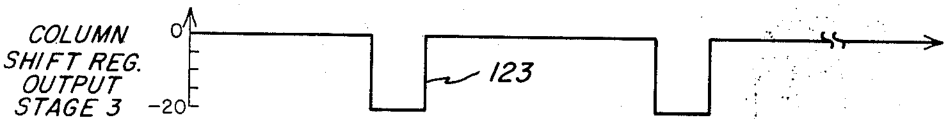
Figure 8H:
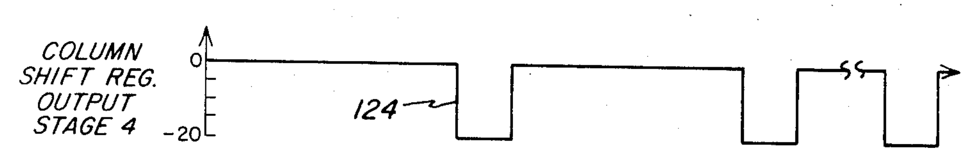
Figure 8I:
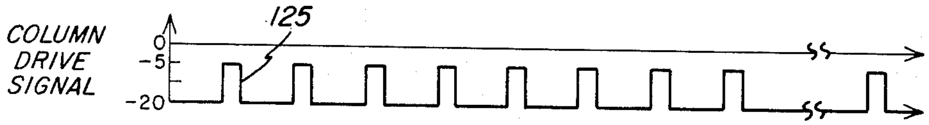

The system will be described in connection with FIGS. 8A–8O which show diagrams of amplitude versus time drawn to a common time scale of signals occurring at various points in the system of FIG. 7. The point of occurrence of a signal of FIGS. 8A–8O is referenced in FIG. 7 by a literal designation corresponding to the literal designation of the figure reference. The amplitudes of the signals of FIGS. 8A–8O are not drawn to a common voltage or current scale for reasons of clarity in explaining the operation of the system in accordance with the present invention.

The system includes a clock pulse generator 71 which develops a series of regularly occurring Y-axis pulses 72 of short duration shown in FIG. 8A, occurring in sequence at instants of time $t_1$–$t_8$ and representing a half scanning cycle of operation of the array and also shows the pulse occurring at time $t_{16}$. The output of the clock pulse generator 71 is applied to a first counter 73 which divides the count of the clock pulse generator by four to derive X-axis clock pulses 74, such as shown in FIG. 8B. The output of the first counter 73 is also applied to a second counter 75 which further divides the count applied to it by four to provide frame synchronizing pulses to the frame sync generator 76.

The sensing array 50, which is identical to the image sensing array of FIG. 3 and is identically designated, includes row conductor lines $X_1$ thru $X_4$ and column conductor lines $Y_1$ through $Y_4$. The drive circuits for the row conductor lines $X_1$–$X_4$ and for the column conductor lines $Y_1$–$Y_4$ of array 50 are included on the same substrate 70 as the array to minimize the number of external connections which are required to be made for utilizing the array 50 in the system. A plurality of row line analog switches 81–84, in the form of MOSFET transistor devices, each having a source electrode, a drain electrode and a gate electrode, are provided. Each of the sources of devices 81–84 connected to one end of a respective one of the row conductor lines $X_1$–$X_4$ and each of the drain of the devices 81–84 are connected to a row line bias terminal 85. Terminal 85 is connected to the negative terminal of a −15 volt source 86, the positive terminal of which is connected to ground. Similarly, a plurality of column line analog switches 91–94 in the form of MOSFET devices, each having a source electrode, a drain electrode and a gate electrode, is provided. Each of the sources of the devices 91–94 is connected to one end of a respective one of column conductor lines $Y_1$–$Y_4$ and each of the drains of the devices 91–94 connected to bias terminal 85. The MOSFET transistors 81–84 and 91–94 are P-channel devices. Accordingly, when the gate electrode of such a device is appopriately negatively biased with respect to the source electrodes a low resistance is provided between source and drain, and conversely in the absence of such bias a high resistance is presented between the source and drain. Gating of the other ends of the row conductor lines $X_1$–$X_4$ is provided by a plurality of MOSFET transistors 101–104 formed integrally on the substrate 70, each having a drain electrode connected to the other end of a respective one of the row conductor lines $X_1$ –$X_4$ and each having a source electrode connected to a column line biasing contact 105 which in the operation in the system is connected to the negative terminal of a −5 volt source 109 the positive terminal of which is connected to ground. Each of the gate electrodes of the transistors 101–104 is driven by a respective drive signal derived from the row shift register 106. The row shift register 106 may be any of a number of shift registers known to the art. The elements of the shift register 106 may be concurrently formed on the substrate at the same time that the devices of the image sensing array 50 are formed.

The shift register 106 is provided with a terminal 107 to which is applied a train of vertical scanning rate clock or X-axis pulses 74, such as shown in FIG. 8B, the recurrence rate of which is one-fourth the recurrence rate of the Y-axis clock pulses. Frame synchronizing pulses derived from counter 75 are applied to frame sync pulse generator 76 to develop an output which is applied to frame synchronizing terminal 108. Each of the frame synchronizing pulses has a duration equal to substantially the sum of the periods of four cycles of Y-axis clock pulses. The frame synchronizing pulses are shifted in the shift register 106 at the X-axis clock rate to cause successive energization of the gate electrodes of the transistors 101–104 connected, respectively, to the lines $X_1$ thru $X_4$ to successively shift the pulse voltage between a −15 volt value and a −5 volt value. The wave form of the drive voltage on $X_1$ is shown in FIG. 8C and the wave form of drive voltage on line $X_2$ is shown in FIG. 8D for one-half of a cycle of operation of the array.

Also integrally formed on the substrate 70 are a plurality of column conductor line drive MOSFET transistors 111–114. Each of the transistors 111–114 has a drain electrode connected to the other end of a respective one of column conductor line $Y_1$–$Y_4$ and each has a source electrode connected to a contact terminal 115 to which a column drive signal is applied. Each of the gate electrodes of the transistors 111–114 is connected to a respective point on the column shift register 116. The column shift register 116 is provided with a input terminal 117 to which Y-axis clock pulses derived from clock pulse generator 71 are applied. The column shift register 116 is also provided with a horizontal line synchronizing terminal 118 to which line synchronizing pulses are applied from line sync pulse generator 119. The line sync pulse generator is connected to the first counter 73 and provides an output synchronized with X-axis clock pulses. The line sync pulses are shifted in the column shift register in response to the Y-axis clocking pulses. The wave form of the line synchronizing pulse applied to the line synchronizing terminal 118 is shown in FIG. 8E which also represents the output of the first stage of the column shift register. The line synchronizing pulse has a width less than the interval between a pair of Y-axis clocking pulses. At output terminal points of the column shift register 116 drive signals 121–124 shown, respectively, in FIGS. 8E–8H are obtained and are applied respectively to transistors 111–114. The drive signals have −20 volts amplitude for the interval indicated. A train of column drive pulses 125, shown in FIG. 8I, synchronized with Y-axis clock pulses are derived from column drive generator 126 and are applied to terminal 115. Each of the pulses 125 are of short duration corresponding to the time during which it is desired to read out the radiation-produced charge stored in a device in a respective column. Such pulses cause injection of stored charge which is sensed across integrating capacitor 130 connected between substrate contact terminal 127 and ground. Contact terminal 127 is conductively connected to ring electrode 68 of substrate 50. The pulses 125 are 10 volts in amplitude between the −15 and −5 volt levels. Accordingly, during the time interval from $t_0$ to $t_1$ the radiation sensing device 51 in the uppermost row and the column at the left of the array 50 is read out followed by the device in the column corresponding to conductor line $Y_2$ etc.

Figure 8J:
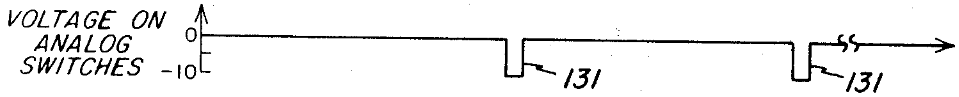

After the completion of the scanning of the devices of row, gating pulses 131 such as shown in FIG. 8J are applied to the gates of each of the devices 81–84 and 91–94 to connected lines $X_1$–$X_4$ and $Y_1$–$Y_4$ to the source 86 of operating potential which establishes proper depletion producing potential on all of the plates of all of the devices 51. As shown each gating pulse occurs after the column drive pulse 125 driving the last device in each row. The gating pulse occurs subsequent to the output of stage 4 of the column shift register and also occurs while the voltage on the X-line is at its storage potential of −15 volts. The duration of the gating pulses is selected to be sufficient to reestablish the −15 volt storage potential on all of the lines. The gating pulses are derived from gate generator 135 which in turn is driven by a counter 136 which provides an output pulse for every four input pulses. The counter is driven by the Y-axis clock pulses from the clock pulse generator 71.

Figure 8K:
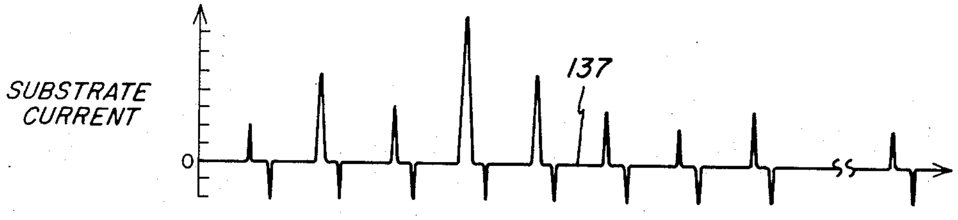

The current flow in circuit with the substrate of the array through substrate contact 127 in response to a sequential scanning of the devices in the first and second rows of the array is depicted in the graph 137 of FIG. 8K. In this figure are shown eight pairs of current pulses corresponding respectively to the current flow in circuit with the substrate 70 during the read out of the devices of the first and second rows $X_1$ and $X_2$ in sequence. The first occurring pulse of each pair corresponds to current flow due to radiation produced charge and to some of the depletion producing charge stored at the instant of application of storage potential to the column-oriented plate of the device. The second occurring pulse of opposite polarity to the first occurring pulse corresponds to the aforementioned current flow resulting from the application of voltage to the column-oriented plate of the device. The first pulse of each pair occurs at the leading edge of a respective one of the column drive pulses 125 and the second pulse of each pair occurs at the lagging edge of a respective one of the column drive pulses. The first pulses are shown of various amplitudes corresponding to various magnitudes of charge stored in the various devices of the first two rows. The amplitudes of the second pulses are identical as the column-oriented cells of each of the devices are identically constituted and hence would take identical charging or depletion region producing current. The important consideration in this connection is not variation in such charging currents among the cells but rather the difference in the charge flow into the substrate to establish the initial depletion and the charge flow out of the substrate on injection of stored charge. Integration of the first and second pulses of each pair of pulses is provided by charging capacitor 130. In accordance with one aspect of the present invention the capacitor 130 represents essentially the capacitance of the substrate of the array in relation to the second or row oriented plates of the devices of the row of devices being scanned or read out and includes stray capacitance such as capacitance of the selected row conductor line and the contact tabs thereof and may also include added capacitance, if desired.

Figure 8L:
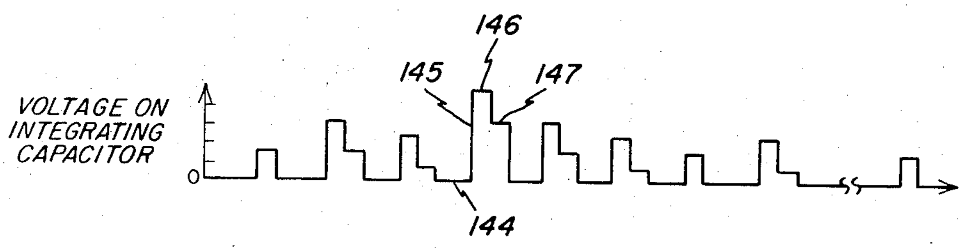
Figure 8M:
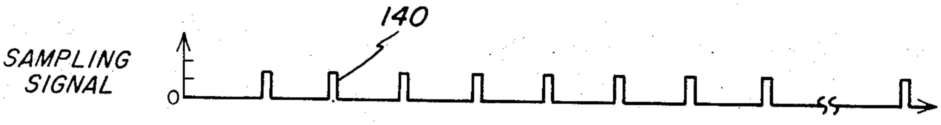
Figure 8N:
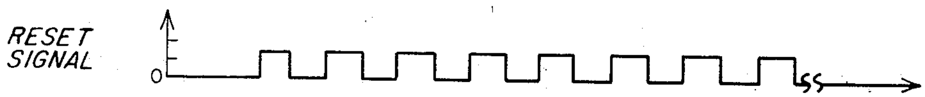
Figure 8O:
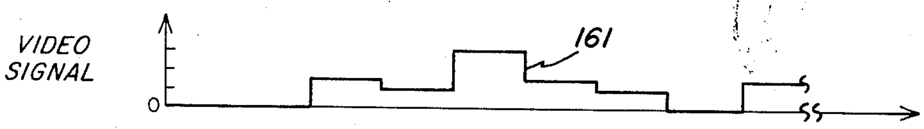

An N-channel field effect transistor 138 is provided having its source to drain circuit connected in shunt with the capacitor 130 and its gate connected to the timing and control circuits 139 which provides reset pulses 141 as shown in FIG. 8N. The reset pulses switch from a ground to a positive voltage level. The trailing edge of each reset pulse is coincident with the leading edge of a respective one of column line drive pulses 125. Accordingly, except during the read out interval for each device 51 the capacitor 130 is shorted or bypassed to ground. On occurrence of a column drive pulse, a pair of current pulses as mentioned above are produced which are integrated by the capacitor 130 and result in a corresponding two level output pulse, the first level corresponding to the charge of the first current pulse and the second level corresponding to the charge of the first current pulse less the charge of the second current pulse. The output across the capacitor is shown in graph 144 of FIG. 8L in which each of the two leveled pulses 145 having a first level 146 and a second level 147 correspond respectively to a respective pair of pulses of FIG. 8K. In the case of the first pulse and seventh pulse of graph 8L, the second level is zero indicating that no radiation produced charge had been stored in the devices corresponding thereto. The period of time conveniently referred to as the first predetermined period represents time during which radiation induced charge is being stored in a device and the period conveniently referred to as a second predetermined period represents time during which charge is being read out. The third predetermined interval represents the time during which the reset switch 138 is closed and the fourth predetermined interval represents the time during which the reset switch is open. As the same switch 138 is used in the read out of charged stored in each of the devices, the array is ungrounded many times during the storage cycle of a device. As signal voltage amplitude is small in relation to storage potentials utilized on the plates such action does not affect the storage in the devices not undergoing read out.

The output appearing across the integrating capacitor 130 is applied to a video channel 150 comprising a first amplifier 151, a sample and hold circuit 152 and a second amplifier 153, the output of which may be applied to the electron beam modulation electrode of a cathode ray tube display device (not shown). The sample and hold circuit 152 includes an N-channel MOSFET transistor 154 having a drain 155, a source 156 and a gate 157 and a capacitor 158. The source to drain current flow path of the transistor is connected between the output of the amplifier 151 and one electrode of the capacitor 158, the other electrode of which is connected to ground. The gate 157 is connected to the timing and control circuits block 139 which provides the train of sampling pulses 140 shown in the graph of FIG. 8M. Each of the pulses 140 are of short duration and are equally spaced along the time axis of the graph. One sampling pulse occurs for every Y-axis clock pulse. Each of the pulses 140 are phased to occur during the occurrence of the back porch or second level 147 of the two level video pulses of FIG. 8L appearing on the integrating capacitor 130. During the sampling intervals the transistor 154 is turned on so as to permit the second capacitor 130 to charge in turn to a voltage corresponding to the voltage 158 of the second levels of the pulses 145 of FIG. 8L. Accordingly, a video signal 161 such as shown in FIG. 8O is provided in which the signal shifts from one video level to another at the sampling interval in accordance with the voltage on the integrating capacitor 130 during the sampling interval. As mentioned above, the video signal 161 is amplified by the second amplifier 153 and applied to a suitable display device for display of the image sensed.

While in the radiation sensing apparatus of FIG. 7 the analog switches 81–84 and 91–94 were provided to isolate the row lines and the column lines after being charged to operating potential by source 86 and to periodically connect such lines to the source at the end of a scanning of a row of devices, it will be understood that each of the lines $Y_1$–$Y_4$ may be completely disconnected from the source of operating potential and the column drive pulses relied upon for reestablishing operating potential on the column lines after injection potential has been applied thereto. A particular advantage of this arrangement is that devices 91–94 and associated circuits are eliminated.

A particular advantage of the utilization of gating pulses, and more particularly for providing gating pulses at the end of a row of scan, is that during the retrace interval the photon generated charge which had accumulated while the various devices of the array were floating in potential can be conducted in the form of capacitor charging current to the various plates of the devices during this interval and the dynamic range of the devices of the array maintained. Also, with a line drive arrangement such as shown and described for the column lines used for the row lines, the row lines may also be completely disconnected from the source of operating potential and the row drive pulses relied upon for reestablishing operating potential on each row line after the scanning thereof. However, as the row conductor lines are addressed for read out less frequently than column conductor lines more need exists for periodically charging the row lines to operating potential.

While the gating of analog switches of the row conductor lines and column conductor lines has been described as occurring at the end of a row of scan or read out, such gating may be applied to the lines at other times provided they have returned to operating potential and the substrate switching device is closed.

While the analog switches connected to the row conductor lines and the analog switches connected to the column conductor lines are shown as returned to a single potential source, it is readily understood that the analog switches of the row conductor lines can be returned to one potential source and the analog switches of the column conductor lines returned to another potential source.

While the invention has been described in connection with an array constituted of an N-type conductivity substrate, a P-type conductivity substrate could as well be used. Of course, in such a case the applied potentials would be reversed in polarity and the current flows would be reversed in direction.

While the invention has been described in specific embodiments, it will be appreciated that modifications, such as those described above, may be made by those skilled in the art, and it is intended by the appended claims to cover all such modifications and changes as fall within the true spirit and scope of the invention.

What we claim as new and desire to secure by Letters Patent of the United States is:

1. In combination, a substrate of semiconductor material of one conductivity type having a major surface, a plurality of first conductive plates, each overlying and in insulated relationship to said major surface and forming a first conductor-insulator-semiconductor capacitor with said substrate, a plurality of second conductive plates, each adjacent a respective first conductive plate to form a plurality of pairs of plates, said pairs of plates being arranged in a matrix of rows and columns, each of said second conductive plates overlying and in insulated relationship to said major surface and forming a second conductor-insulator-semiconductor capacitor with said substrate, each coupled to a respective first conductor-insulator-semiconductor capacitor, a plurality of column conductor lines, the first conductive plates in each of said columns connected to a respective column conductor line, a plurality of row conductor lines, the second conductive plates in each of said rows connected to a respective row conductor line, a substrate switching device connected between said substrate and a reference potential point, means for discharging from and charging to a predetermined potential with respect to said reference potential each of said row conductor lines in sequence during a respective period of time, said means conductively isolating said row conductor lines from said substrate other than a respective row conductor line during a respective period of time, means for discharging from and charging to another predetermined potential with respect to said reference potential each of said column conductor lines in sequence during a respective other period of time shorter than said one period of time and included in said one period, said means conductively isolating said column conductor lines from said substrate other than a respective column conductor line during a respective other period of time, means for periodically operating said substrate switching device to disconnect from and connect to said substrate said reference potential point during a third period of time, each of said third periods of time spanning a respective other period of time, whereby carriers stored in the depletion regions underlying the second plates of a respective row flow into the depletion regions underlying the first plates thereof, and such carriers underlying each of said first plates are injected in sequence into said substrate during a respective one of said third periods of time thereby producing a respective voltage between said substrate and said reference potential point, means connected in circuit with said substrate and said reference potential point for sampling the voltage between said substrate and said reference potential point during said third periods to develop an electrical signal in accordance with the amplitudes of said samples, 2. The combination of claim 1 in which means are provided for charging said row conductor lines to said one predetermined potential at times other than during said one predetermined periods and during said third periods.

3. The combination of claim 2 in which said charging means for said row conductor lines includes a plurality of row line switching devices, each connected in circuit between a respective row conductor line and a terminal adapted to be connected to a source for establishing said one predetermined potential.

4. The combination of claim 2 in which is also provided means for charging said column conductor lines to said other predetermined potential at times other than said other predetermined periods and during said third predetermined periods.

5. The combination of claim 4 in which said charging means for said column conductor lines includes a plurality of column line switching devices, each connected in circuit between a respective column conductor line and another terminal adapted to be connected to another source for establishing said other predetermined potential.

6. The combination of claim 4 in which said row conductor lines and column conductor lines are charged periodically and at the same time by said row line charging means and said column line charging means.

7. The combination of claim 6 in which said same time is at the end of read out of charge stored in each row of plates.

8. The combination of claim 1 in which said one period is many times longer than said other period.

9. The combination of claim 5 in which said charging means for said row conductor lines includes a plurality of row line switching devices, each connected in circuit between a respective row conductor line and a terminal adapted to be connected to a source for establishing said one predetermined potential.

10. The combination of claim 1 in which said one predetermined potential and said other predetermined potential are identical.

* * * * *